Sept. 13, 1949.  R. D. GAMBRILL  2,481,655
APPARATUS FOR LOCATING FAULTS IN CABLES
Filed June 29, 1946
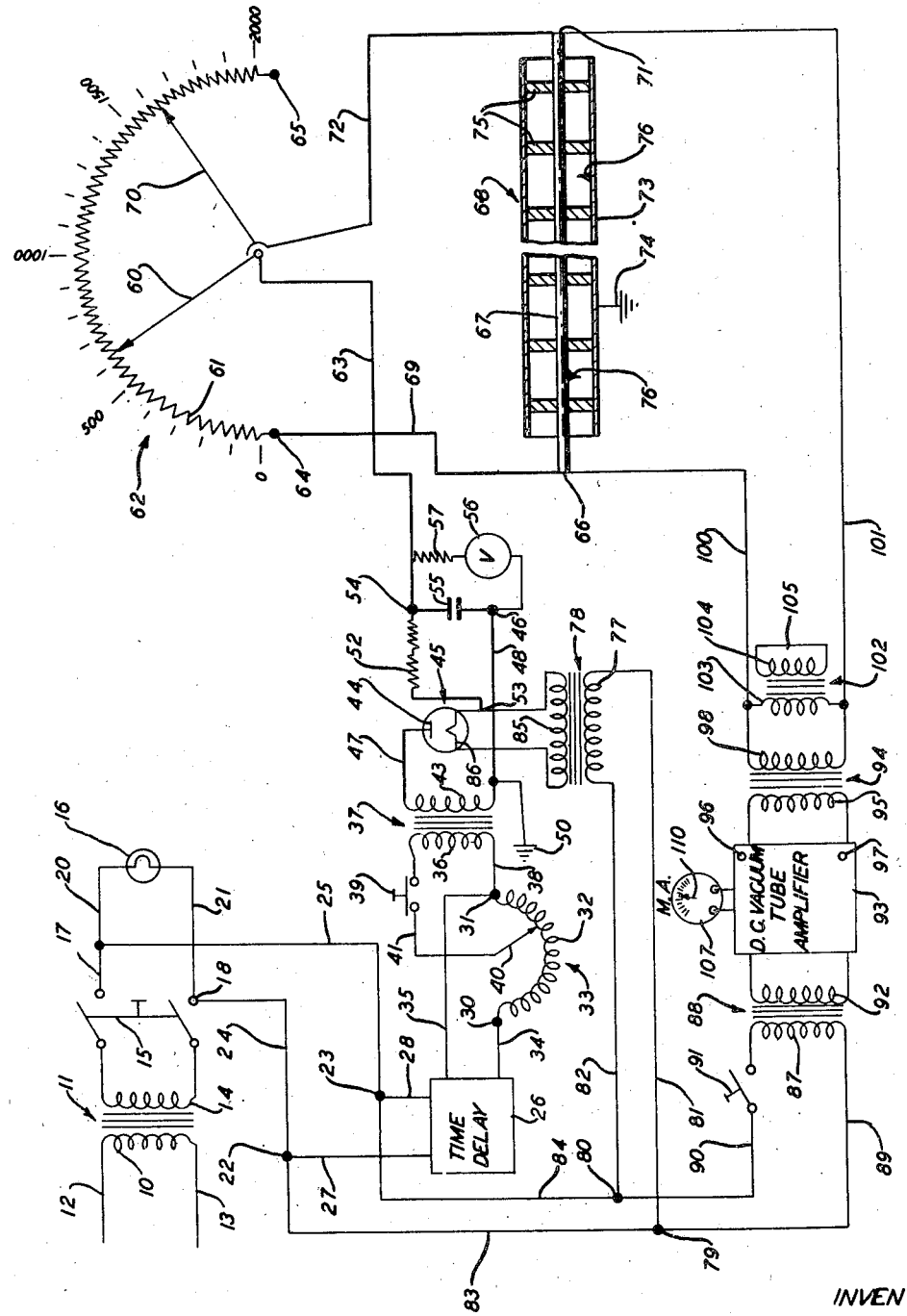
INVENTOR
R.D. GAMBRILL
BY
ATTORNEY Patented Sept. 13, 1949

2,481,655

UNITED STATES PATENT OFFICE 2,481,655

APPARATUS FOR LOCATING FAULTS IN CABLES

Richard D. Gambrill, Baltimore, Md., assignor to Western Electric Company, Incorporated, New York, N. Y., a corporation of New York Application June 29, 1946, Serial No. 680,497

3 Claims. (Cl. 175—183)

1

This invention relates to fault locating apparatus and more particularly to apparatus for locating arcing type of faults in coaxial cable units.

Coaxial cable units usually comprise a filamentary central conductor and an outer tubular conductor, which is spaced away from and maintained coaxially of the central conductor by means of wafer-like insulating discs spaced at uniform intervals along the central conductor. This type of construction produces a conductor having, for the most part, an air dielectric between the inner and outer conductors.

In the prior art various means have been employed for locating high resistance faults in the insulating jacket surrounding an electric conductor. Of these, the Wheatstone bridge method appears to be the more widely used method. The Gambrill et al. Patent No. 2,460,688, granted February 1, 1949, is an example of such prior art. In one well known method, a conductor of the cable to be tested is connected in parallel with a calibrated potentiometer, whereupon a high D. C. testing potential is impressed across the parallel circuit to produce a high potential difference between the conductor and its respective insulating jacket being tested. This high potential difference breaks down a defect in the insulating jacket and divides the cable thereat into two arms which together with the potentiometer form a Wheatstone bridge circuit. This breakdown unbalances the bridge circuit and causes a steady current to flow in the detector circuit thereof until the bridge circuit is balanced by proper manipulation of the balancing arm of the potentiometer.

However, this method has usually been confined to locating faults in conductor insulating jackets composed of rubber or rubber-like materials where a breakdown therein results in a steady current flow in the bridge detector circuit. In the case of a coaxial cable unit, it is quite common to have a fault in the coaxial unit completely surrounded by the air dielectric. When a coaxial cable unit is connected in a Wheatstone bridge circuit, such as that described above, and a high D. C. breakdown potential is impressed across the central and tubular conductors thereof, the air dielectric will break down at the fault location. As a result, the potential creates an arc across the fault and causes a pulsating current of short duration, comprising a fundamental frequency and various harmonics superposed thereon, to flow in the detector circuit of the bridge. A D. C. milliameter is usually

2 employed in the detector circuit to facilitate an accurate balance of the bridge, and such a pulsating high frequency current could not be properly recorded by this type of instrument. In addition, such a pulsating current seriously interferes with the balancing of the bridge circuit due to the inductance of the potentiometer and the capacitance of the coaxial unit. Therefore, in order to accurately locate the position of an arcing type of fault in a coaxial unit, suitable means must be employed in the detector circuit to block out the high frequency components of the current flowing therein due to the breakdown of a fault in the coaxial unit, so that the current which actually flows through the D. C. milliammeter more nearly approaches a D. C. current flow.

An object of the invention is the provision of new and improved apparatus for locating faults in coaxial cable units.

The foregoing object is attained in accordance with this invention by a form of a Wheatstone bridge circuit in which the central conductor of a coaxial unit to be tested is connected in parallel with a calibrated potentiometer. A high D. C. breakdown potential, applied from a charged condenser, is impressed across the bridge circuit, whereby the central conductor and tubular conductor of the coaxial unit are connected to opposite sides of the condenser. The high D. C. potential breaks down the coaxial dielectric at a fault location and divides the coaxial unit thereat into two arms, which together with the potentiometer form a Wheatstone bridge circuit. This breakdown of the dielectric cause a pulsating high frequency current to flow through the bridge circuit and its associated detector circuit, which comprises a low pass filter, a D. C. amplifier and an associated milliammeter. The low pass filter serves to block out the high frequency components of the breakdown current, so that the milliammeter may respond to the low frequency current flow each time the air dielectric breaks down and the condenser discharges across the fault.

A complete understanding of the invention may be obtained from the following detailed description of a specific embodiment thereof, when read in conjunction with the appended drawing in which the single figure is a circuit diagram of an apparatus constituting one embodiment of the invention.

Referring more specifically to the drawing, a primary winding 10 of a stepdown transformer 11 is connected across a suitable A. C. power source (not shown) by conductors 12 and 13 and has its secondary winding 14 connected to the line terminals of a two-pole single throw switch 15. A pilot lamp 16 is connected directly across the load terminals 17 and 18 provided on the switch 15 by conductors 20 and 21, respectively, which terminals are in turn connected to a pair of junction points 22 and 23 by conductors 24 and 25, respectively. The pilot lamp 16 is connected across the load terminals of the switch 15 for the purpose of indicating the position of the switch 15 which, in turn, is an indication of when A. C. potential is being supplied to the apparatus hereinafter to be described.

A conventional motor driven timer 26 has its input terminals connected directly across the junction points 22 and 23 by means of conductors 27 and 28, respectively, and its output terminals connected to a pair of input terminals 30 and 31 provided on a transformer winding 32 of a conventional voltage regulator 33, by means of conductors 34 and 35, respectively. A primary winding 36 of a standard plate transformer 37 has one end thereof connected directly to the terminal 31 of the regulator 33 by a conductor 38, and the other end thereof connected to one side of a normally open "Test" switch 39, the other side of which is connected to a movable arm 40 provided on the voltage regulator 33 by a conductor 41. The movable arm 40 provided on the voltage regulator 33 slidably engages the winding 32 whereby the position of the arm 40 regulates the A. C. potential which is to be applied across the primary winding 36 of the transformer 37.

A secondary winding 43 of the transformer 37 has one end thereof connected directly to a plate 44 of a half-wave mercury vapor rectifier tube 45 and the other end thereof connected to a junction point 46 by means of conductors 47 and 48, respectively, the conductor 48 being grounded as shown at 50. A current limiting resistor 52 has one end thereof connected to a positive terminal 53 provided on the rectifier 45 and the other end thereof connected directly to a terminal 54 provided on a high voltage condenser 55 whose opposite side is connected directly to terminal 46. A D. C. voltmeter 56 and a resistor 57 are connected in series and thence directly across the terminals 46 and 54 provided on the condenser 55. The voltmeter 56 serves to indicate the D. C. potential difference across the plates of the condenser 55, which indication facilitates the proper adjustment of the arm 40 on the winding 32 so as to obtain the required D. C. testing potential across the terminals 46 and 54.

The transformer 33 serves to step up the potential applied to the primary winding 36, which stepped up potential is applied directly across the terminals 46 and 54 of the high voltage condenser 55 through the mercury vapor rectifier 45 which, being a half-wave rectifier, produces a pulsating, uni-directional current flow in the condenser circuit. This uni-directional pulsating current serves to build up a high D. C. potential charge on the plates of the condenser 55 and, likewise, across the terminals 46 and 54. The high D. C. potential charge of the condenser 55 is that potential which is to be impressed across the central conductor and tubular conductor of a coaxial unit, in a manner hereinafter to be described, in order to test the air dielectric of a given length of coaxial unit.

A balancing arm 60 which slidably engages a winding 61 provided on a calibrated potentiometer 62 is connected directly to the terminal 54 by means of a conductor 63. The calibrations of the winding 61 begin at a zero terminal 64 and increasingly progress around the winding in a clockwise direction to a terminal 65 at the opposite end of the winding. The winding 61 is calibrated in feet, whereupon each calibration represents a resistance proportional to a given number of feet of coaxial unit, and the balancing arm 60 is free to move between the ends 64 and 65 of the winding 61. The zero terminal 64 is connected directly to an end 66 of a central conductor 67 of a typical coaxial unit 68 by means of a conductor 69. The calibrated potentiometer 62 is provided with an adjustable end terminal 70 which is connected to the opposite end 71 of the central conductor 67 by means of a conductor 72. The adjustable terminal 70 is positioned on the winding 61 at a point equal to the exact number of feet present in the coaxial unit 68, in which case the central conductor 67 thereof is connected in parallel with that portion of the winding 61 of the calibrated potentiometer 62 which lies between the zero terminal 64 and the terminal 70. The terminal 54 of the condenser 55 is connected directly to the potentiometer winding 61 which in turn is connected directly to the central conductor 67, and the tubular conductor 73 is grounded as indicated generally at 74, which places the outer conductor 73 at the same potential as that existing at the grounded terminal 46 of the condenser 55. As a result, the potential charge of the condenser 55 is applied directly across the parallel circuit so that it is directly across the central conductor 67 and the tubular conductor 73 of the coaxial unit 68.

The central conductor 67 of the coaxial unit 68 has a plurality of insulating discs 75—75 uniformly spaced thereon which serve to coaxially support the tubular conductor 73 with respect to the central conductor 67. This type of construction provides a coaxial unit having a plurality of air cells between the discs 75—75, in which the free air therein is the insulating medium between the central conductor 67 and the tubular conductor 73. During the manufacture of a coaxial unit, such as a coaxial unit 68, there may develop within these air cells faults which reduce the spacing between the conductors, such as faults indicated generally on the drawing at 76—76. The faults 76—76 usually take the form of conductive slivers which project either from the normal surface of the central conductors 67 or from the tubular conductor 73, and in either case reduce the required amount of air dielectric between the central and tubular conductors at these points. When a coaxial unit having such faults is connected in a parallel circuit, as described above, and has a high D. C. potential difference applied directly to the central conductor and the tubular conductor, the air dielectric at the fault 76 will break down and arcing will occur across the fault, which causes a pulsating high frequency current to flow in the parallel circuit. The faults 76—76 will hereinafter be referred to as "arcing" type faults, as distinguished from the more common type of fault known as a "short circuit" fault.

This arcing across the fault 76 continues until the condenser 55 discharges to a point where the charge thereon is insufficient to maintain the breakdown across the fault, whereupon the arcing ceases. The condenser 55 is constantly being charged by the rectifier 45, and when the charge therein reaches its normal value of potential, the dielectric at the fault will again break down and arcing will again occur thereacross. Each time the dielectric of the coaxial unit breaks down, a pulse of high frequency current consisting of a fundamental uni-directional pulse and various harmonics superposed thereon flows across the arc and divides the coaxial unit 68 thereat into two legs, which together with corresponding portions of the potentiometer winding 61 on each side of the balancing arm 60, form a Wheatstone bridge circuit. A detector circuit, to be presently described, is connected across the ends of the parallel circuit for the purpose of indicating when the coaxial unit under test contains such an arcing type of fault and also when the balancing arm of the potentiometer has divided the winding 61 in correct proportion with respect to the position of the fault in the coaxial unit connected in parallel therewith.

A primary winding 77 of a transformer 78 is connected to terminals 79 and 80 by means of conductors 81 and 82, respectively, which terminals are in turn connected to the terminals 22 and 23 by means of conductors 83 and 84, respectively. The transformer 78 has its secondary winding 85 connected directly across a filament 86 of the rectifier tube 45, which filament serves to heat up the tube 45 and make it conductive in one direction between the plate 44 and the terminal 53. The purpose of the timer 26 is to maintain the plate circuit of the rectifier tube 45 open until the filament 86 which is energized by the transformer 78 has sufficient time to heat up the tube. A primary winding 87 of a transformer 88 is connected directly across the terminals 79 and 80 by means of conductors 89 and 90, respectively, the conductor 90 having in series therewith a single pole switch 91 which controls the energization of the transformer 88. A secondary winding 92 of the transformer 88 is connected directly to the power terminals of a D. C. vacuum tube amplifier indicated generally at 93.

A detector circuit is connected across the parallel circuit formed by the coaxial unit 68 and the calibrated potentiometer 62. This detector circuit comprises a transformer 94 having its secondary winding 95 connected to the input terminals 96 and 97 of the D. C. amplifier 93 and its primary winding 98 connected directly across the ends 65 and 71 of the central conductor 67 by means of conductors 100 and 101, respectively, and a pulse transformer 102 having its primary winding 103 connected directly across the winding 98 of the transformer 94 and its secondary winding 104 short circuited by means of a conductor 105. The transformer 94 may be considered in this particular application as a low pass filter which, due to the hysteresis and eddy current effects of the iron circuit plus the inductance of the primary winding, serves to substantially block out the high frequency harmonics present in the pulsating current flowing in the detector circuit and allows only the substantially uni-directional current pulse to reach the input terminals of the D. C. amplifier 93. The pulse transformer 102 is connected in the detector circuit for the purpose of further stabilizing the current flowing in the detector circuit by absorbing the high frequency harmonics of the breakdown current which are blocked out by the transformer 94 thereby permitting the bridge circuit to be more accurately balanced.

The D. C. vacuum tube amplifier 93 is of the saturation type well known to those skilled in the art of electrical testing and serves both to amplify a low potential difference impressed across the input terminals 96 and 97 and also to limit the effect of a high potential difference across the terminals 96 and 97 upon a milliammeter 107 connected in the output or plate circuit of the D. C. amplifier. When the power circuit to the amplifier 92 is closed by means of the switch 91, the amplification factor of the amplifier may be adjusted so that the milliammeter needle 110 will assume a mid-scale position as shown on the drawing, assuming that while this adjustment is being made, the switch 39 is open and no potential is supplied across the input terminals 96 and 97. However, when a potential difference exists across the input terminals, the milliammeter needle 110 will be deflected to the right or the left of its center position depending on the polarity of the potential difference existing across the input terminals.

The amplifier 93 shown on the drawing may be any conventional type that will accomplish the desired results, a preferred type being Model 715-A manufactured by the General Radio Company of Cambridge, Massachusetts. The method of adjusting the amplifier to obtain a mid-scale reading on the milliammeter 107 and the use of the amplifier as a means for protecting a sensitive current responsive instrument such as milliammeter 107 is described on pages 111, 112, 134 and 135 of J. F. Rider's book, "Vacuum Tube Voltmeters," John F. Rider Publisher, Inc., 1941 New York City.

Operation

The above-described apparatus operates in the following manner to determine and locate the position of an arcing type fault which may occur in a coaxial cable unit:

Assuming that the schematic diagram shown on the drawing represents the wiring connections of a suitable, compact test set housing all of the apparatus associated therewith, a predetermined length of a coaxial unit, such as a reel of a coaxial unit or of a cable containing more than one of these units, is connected to the test set by means of the leads as 69 and 72. The coaxial unit 67 is now connected in parallel with the calibrated potentiometer 62 and the adjustable end terminal 70 is positioned on the winding 61 opposite the calibration which represents the number of feet of coaxial unit being tested. The outer conductor of the coaxial unit 67 is adequately grounded by suitable connectors provided on the test set and which grounding is generally indicated on the drawing at 74.

The safety switch 15 is operated to the closed position, whereby the output potential of the transformer 11 is connected directly to the pilot lamp 16 which is energized and indicates that A. C. potential is supplied to the timer 26, the transformer 78 and the transformer 88. When the switch 15 is closed the timer 26 immediately begins its timing cycle during which period the potential circuit feeding the transformer 33 is open circuited and the filament 84 is given sufficient time to heat up the rectifier tube 45. During the timing cycle, the switch 91 is closed, whereby the transformer 88 is energized and delivers A. C. potential to the power terminals of the D. C. amplifier 93. The amplifier 93 is then adjusted so that the milliammeter needle 110 of the milliammeter 107 connected in the output circuit of the amplifier will assume a mid-scale position. Should the timer 26 complete its cycle during the adjustment of the amplifier 93 no potential is applied across the winding 36 because the test switch 39 is open, therefore, there can be no potential difference across the input terminals 96 and 97 of the amplifier 93 to interfere with the proper adjustment of the milliammeter needle 110 to the desired mid-scale position.

When the timer once completes its timing cycle, it maintains itself in a closed position whereby the voltage regulator 33 is continuously energized thereby. The test switch is now depressed so that the A. C. potential from the voltage regulator 33 is delivered across the primary winding 36 of the transformer 37. This A. C. potential is stepped up by transformer 37 and delivered to the plate 44 of the rectifier 45 and the terminal 46 of the high voltage condenser 55. The positive output terminal 53 of the rectifier tube 45 is connected to the terminal 54 of the condenser 55, whereby the high A. C. potential created by the transformer 37 is changed into a pulsating, uni-directional potential by means of the half-wave rectifier tube 45. During each period of the voltage wave at which the tube 45 is conductive, the condenser 55 receives a surge of potential and as the operation of the tube proceeds in this manner a high D. C. potential charge is built up on the plates of the condenser 55. The movable arm 40 provided on the transformer 33 serves to regulate the input voltage to the transformer 37 and thereby controls the amount of potential difference which exists across the terminals 46 and 54, which potential is indicated on the voltmeter 56.

The high D. C. potential charge of the condenser 55 is impressed directly across the central conductor 67 and the tubular conductor 73 of the coaxial unit 68, which, due to the construction of the coaxial unit is similar to charging a condenser in which the tubular conductor and the central conductor may be considered as the opposite plates of the condenser with the air space therebetween as the dielectric. The air space between the central conductor 67 and the tubular conductor 73 will have a definite dielectric strength and will safely withstand an application of predetermined potential impressed thereacross. However, should the coaxial unit 68 contain an arcing type of fault, such as the type of faults indicated 76—76, the spacing between the two conductors 67 and 73 is decreased to such an extent that the high D. C. potential applied thereacross will break down the air dielectric and arc across the fault. Current will flow with the arc and divide the coaxial unit thereat into two arms which, together with the respective portions of the calibrated potentiometer, form a Wheatstone bridge circuit. The arcing will continue at the fault until the condenser 55 has been discharged to such an extent that the potential is no longer sufficient to break down the dielectric at the fault whereupon the arcing will cease. However, the rectifier tube 45 continues to charge the condenser 55 until the D. C. potential builds up across its plates to a value which will again break down an air dielectric at the fault. Each time that the breakdown occurs and the condenser 55 discharges across the fault 76, a pulsating high frequency current flows in the unbalanced bridge circuit, which is composed of a fundamental uni-directional pulse having various high frequency harmonics superposed thereon. This pulsating high frequency current also flows in the detector circuit each time the fault 76 breaks down and arcing occurs thereacross.

In order to facilitate the use of a sensitive D. C. milliammeter 107 as a means of indicating when the bridge is balanced, the detector circuit is connected to the primary winding 98 of the transformer 94. The transformer windings 95 and 98, plus the iron core of the transformer 94 serve to block out the high frequency harmonics of the current flowing in the detector circuit and allow only the fundamental uni-directional current to pass through the transformer 94 and induce a potential on the input terminals 96 and 97 of the amplifier 93. Since the high frequency harmonics are removed by the transformer 94, the milliammeter 107 is subjected to a series of substantially uni-directional current pulses, which will cause an intermittent deflection of the needle 110 to the right or left of its mid-scale position depending upon the polarity of the potential difference existing in the unbalanced bridge circuit. The balancing arm 60 of the potentiometer 62 is moved in either a clockwise or counterclockwise direction along the winding 61 until the milliammeter needle 110 assumes its mid-scale position with a minimum amount of movement, at which point the bridge circuit is balanced and no current flows in the detector circuit. The final position of the balancing arm 60 of the potentiometer 62 indicates the number of feet that the arcing fault exists in the coaxial unit 68 from the left end or terminal 65 of the coaxial unit.

When this point has been reached on a particular coaxial unit, the test leads 69 and 72, respectively, are removed therefrom and connected to another reel of coaxial unit similar to 68 and the test set operated in the manner described above to determine and locate the position of arcing type of faults. The coaxial units which prove defective under the above-described insulation test are opened up at the points indicated by the test and repaired when the individual case warrants such action.

What is claimed is:

1. In an apparatus for testing for and locating faults which provide paths of reduced dielectric strength between the filamentary central conductor and the tubular conductor of a coaxial unit, including a calibrated potentiometer winding connected across the ends of the central conductor of a coaxial unit to be tested so as to form a parallel circuit therewith and means for impressing across the potentiometer winding and the tubular conductor of the coaxial unit a uni-directional potential having an intensity sufficient to break down the air dielectric between the conductors of the coaxial unit at a fault therein and cause a pulsating breakdown current to flow through the parallel circuit and form a Wheatstone bridge circuit, said pulsating breakdown current consisting of a fundamental uni-directional current pulse having various high frequency components superposed thereon, an improved detector circuit connected across the ends of the central conductor of the coaxial unit which comprises a sensitive D. C. current responsive meter connected therein for indicating when a breakdown occurs in the coaxial unit and when the bridge circuit is balanced, electronic means connected between the D. C. meter and the bridge circuit for limiting the current flowing in the detector circuit to a value within the range of the meter, a non-capacitive impedance designed to block out the high frequency components of the breakdown current and pass only the fundamental current pulse thereof to the current limiting means and the D. C. meter, and a second non-capacitive impedance designed to pass the high frequency components of the breakdown current which were stopped by the first-mentioned impedance and permit the said high frequency components to return to the bridge circuit without interfering with the balancing of the bridge circuit.

2. In an apparatus for testing for and locating faults which provide paths of reduced dielectric strength between the filamentary center conductor and the tubular conductor of a coaxial cable unit, including a calibrated potentiometer having its winding connected across the ends of the center conductor of a coaxial unit to be tested and means for impressing across the potentiometer winding and the tubular conductor of the coaxial unit a uni-directional potential having an intensity sufficient to break down any faults providing paths of reduced dielectric strength between the conductors of the coaxial unit and to arc thereacross and divide the coaxial unit into two portions which together with the potentiometer form a Wheatstone bridge circuit, said arcing between the conductors of the coaxial unit causes a pulsating breakdown current to flow in the bridge circuit which consists of a fundamental uni-directional pulse having various high frequency components superposed thereon, an improved detector circuit connected across the ends of the center conductor of the coaxial unit which comprises a sensitive D. C. current responsive meter connected therein for indicating when a breakdown occurs in the coaxial unit and when the bridge circuit is balanced, an iron core transformer having its primary winding connected to receive the breakdown current flowing in the bridge circuit, said primary winding and its associated iron core having sufficient impedance to block out the high frequency components of the breakdown current and to permit only the fundamental pulse thereof to flow therethrough and induce a corresponding potential pulse in the secondary winding of the transformer, a D. C. vacuum tube amplifier having its input terminals connected between the D. C. meter and the secondary winding of the transformer for limiting the current flow to the D. C. meter to a value within the range of the meter, and a second transformer having its primary winding connected across the detector circuit in parallel with the primary winding of the first-mentioned transformer and its secondary winding short circuited, said second mentioned transformer having an impedance which will pass the high frequency components of the breakdown current and allow them to return to the bridge circuit, whereby the high frequency components of the breakdown current do not reach the D. C. meter and interfere with the balance of the bridge circuit.

3. In an apparatus for testing for and locating faults which provide paths of reduced dielectric strength between the filamentary center conductor and the outer tubular conductor of a coaxial cable unit, including a calibrated potentiometer having its winding connected across the ends of the central conductor of a coaxial unit to be tested and means for impressing across the potentiometer winding and the tubular conductor of the coaxial unit a uni-directional potential having an intensity sufficient to breakdown any faults providing paths of reduced dielectric strength between the conductors of the coaxial unit and to arc thereacross and divide the coaxial unit into two portions which together with the potentiometer form a Wheatstone bridge circuit, said arcing between the conductors of the coaxial unit causes a pulsating breakdown current to flow in the bridge circuit which consists of a fundamental uni-directional pulse having various high frequency components superposed thereon, an improved detector circuit connected across the common terminals of the potentiometer winding and the center conductor of the coaxial unit which comprises a sensitive D. C. meter for indicating when a breakdown occurs in the coaxial unit under test and when the bridge circuit is balanced, a D. C. vacuum tube amplifier having its output terminals connected to the D. C. meter for limiting the current flow to the meter to a value within the range of the meter when a high amperage breakdown current flows in the bridge circuit, a filter transformer having its low potential winding connected across the detector circuit and its high potential winding connected across the imput terminals of the amplifier, and a pulse transformer having its primary winding connected in parallel with the primary winding of the filter transformer and its secondary winding short circuited, said filter transformer and pulse transformer coacting to form a low pass filter in which the filter transformer permits only the fundamental uni-directional pulse of the breakdown current to flow therethrough and induce a corresponding potential across the D. C. amplifier and the short circuited pulse transformer passes the high frequency components of the breakdown current therethrough and returns them to the bridge circuit, whereby only the fundamental uni-directional pulse of the breakdown current actuates the D. C. meter.

RICHARD D. GAMBRILL.

REFERENCES CITED

The following references are of record in the file of this patent:

UNITED STATES PATENTS

| Number | Name | Date |
|---|---|---|
| 754,402 | Wiseman | Mar. 8, 1904 |
| 1,665,397 | Wunseh | Apr. 10 1928 |
| 1,958,361 | Estes et al. | May 8, 1934 |
| 2,108,637 | Bartgis | Feb. 15, 1938 |
| 2,130,865 | Watts et al. | Sept. 20, 1938 |

OTHER REFERENCES

Rider Vacuum Tube Voltmeters, John F. Rider Publisher, Inc.